United States Patent
Rehm (10) Patent No.: US 6,649,878 B2
(45) Date of Patent: Nov. 18, 2003

(54) HEATING DEVICE

(75) Inventor: Johannes Rehm, Schellklingen (DE)

(73) Assignee: Rehm Anlagenbau GmbH (DE)

( * ) Notice: Subject to any disclaimer, the term of this patent is extended or adjusted under 35 U.S.C. 154(b) by 162 days.

(21) Appl. No.: 09/732,355

(22) Filed: Dec. 7, 2000

(65) Prior Publication Data

US 2002/0056710 A1 May 16, 2002

(30) Foreign Application Priority Data

Dec. 9, 1999 (DE) .................................. 299 21 643 U (51) Int. Cl.⁷ .......................... H05K 3/34; B23K 3/047; F27B 9/14
(52) U.S. Cl. .................... 219/388; 198/435; 198/447
(58) Field of Search ......................... 219/388, 400, 219/411; 198/582, 601, 468.01, 468.1, 468.6, 435, 447; 99/386, 443 C; 432/124, 128

(56) References Cited

U.S. PATENT DOCUMENTS

| | | | | |
|---|---|---|---|---|
| 2,536,756 A | * | 1/1951 | Lopez ......................... | 198/435 |
| 4,164,391 A | * | 8/1979 | Howard et al. ............. | 432/124 |
| 4,189,631 A | * | 2/1980 | Baker et al. ................ | 219/388 |
| 4,610,886 A | * | 9/1986 | Buller-Colthurst .......... | 426/233 |
| 4,699,263 A | * | 10/1987 | Nakamura et al. .......... | 198/435 |
| 4,833,301 A | * | 5/1989 | Furtek ........................ | 219/388 |
| 4,867,299 A | * | 9/1989 | Fukuoka et al. ............. | 198/435 |
| 5,158,224 A | * | 10/1992 | Baker et al. ................ | 228/37 |
| 5,409,097 A | * | 4/1995 | Hoegger ................... | 198/463.2 |
| 5,409,543 A | * | 4/1995 | Panitz et al. ................ | 219/388 |
| 5,481,087 A | * | 1/1996 | Willemen ................... | 219/388 |
| 5,766,002 A | * | 6/1998 | Silvestrini .................... | 432/121 |
| 5,770,835 A | * | 6/1998 | Sakuyama et al. .......... | 219/388 |
| 5,922,230 A | * | 7/1999 | Yokota ....................... | 219/388 |
| 6,008,476 A | * | 12/1999 | Neiconi et al. ............. | 219/388 |
| 6,015,966 A | | 1/2000 | Rehm ........................ | 219/388 |
| RE36,941 E | * | 11/2000 | Wolfe et al. ............... | 99/443 C |
| 6,294,763 B1 | * | 9/2001 | Aono et al. ................. | 219/400 |

FOREIGN PATENT DOCUMENTS

| | | |
|---|---|---|
| DE | 3841 167 A1 | 6/1990 |
| DE | 29704601 U1 | 7/1997 |
| JP | 7-255388 | * 10/1995 |

* cited by examiner

Primary Examiner—Joseph Pelham
(74) Attorney, Agent, or Firm—Sheridan Ross P.C.

(57) ABSTRACT

A heating device for heating merchandise, especially printed boards, comprises a feeding device provided in front of a least one heating line in the transport direction of the merchandise and a discharge device provided behind the heating line in the transport direction, wherein a number of heating zones/devices and/or cooling zones/devices or the like are associated with the heating line.

To improve a heating device of the aforementioned type by increasing the throughput of merchandise in a simple manner, at least two heating lines are disposed on top of each other, to which merchandise can be separately fed by the feeding device from a horizontal transport level, and the merchandise can be separately discharged from the heating lines by the discharge device from the heating lines back into a horizontal transport level.

35 Claims, 4 Drawing Sheets

HEATING DEVICE

The invention relates to a heating device for heating merchandise, especially printed boards, comprising a feeding device provided in front of at least one heating line in the transport direction of the merchandise and a transportation device provided behind the heating line in the transport direction, wherein a number of heating zones/devices and/or cooling zones/devices or the like are associated with the heating line.

Such a heating device is known from DE 297 04 601. A heating line extending essentially transversely to the transport direction and leading the merchandise approximately around in a circular manner is thereby fed with merchandise in the form of printed boards by corresponding feeding devices, which merchandise is transported away from the heating line by corresponding transportation devices. The feeding and the transportation take place in horizontal planes in the direction of the transport direction, whereby said horizontal planes may be disposed so as to be offset to each other. A number of zones or devices for heating and cooling are positioned along the heating line. The corresponding heating zones or respectively devices serve, for example, the re-melting of solder paste, i.e. the so-called reflow soldering, the hardening of adhesives for fixing components on the printed boards, the drying of lacquer on the printed boards etc.

A corresponding heating zone may, for example, be formed of a region of the heating line, in which heated air is supplied. Also a direct heating by means of a heating device such as an infrared lamp or the like may take place. A cooling zone, may, for example, be disposed between two heating zones or heating devices, whereby the cooling may simply take place by the dissipation of heat to the environment in the cooling zone. Moreover, an active cooling device may be provided, which cools the merchandise to a certain temperature. Furthermore, a cooling gas may be correspondingly fed and discharged in the cooling zone analogously to the heating gas.

Due to the arrangement of the heating line the known heating device according to DE 297 04 601 is very compact and efficient in the exploitation of heating gas and cooling gas, which results from the vertically disposed heating line sections. The throughput of said known heating device is, however, not large enough to allow an operation without a delayed supply of printed boards or correspondingly laborious buffers.

The invention is, therefore, based on the object to improve a heating device of the aforementioned type by increasing the throughput of merchandise in a simple manner.

Said object is provided in connection with the features of the preamble of claim 1 by disposing at least two heating lines on top of each other, to which merchandise can be separately fed by the feeding device from a horizontal transport level, and by the transportation device separately discharging the merchandise from the heating lines back into a horizontal transport level. Both horizontal transport levels may be arranged so as to be offset to each other or may be arranged in one plane.

By disposing the at least two heating lines on top of each other, essentially double the number of printed boards or the like as merchandise can simultaneously be handled in the same period of time without requiring more space or additional feeding and transportation devices. Thus, the time required for processing such merchandise is reduced while the costs are decreased at the same time.

In order to be capable of taking the merchandise by the heating device according to the invention prior to the feeding thereof to the heating lines during a relatively fast feeding of the merchandise, and also to be able to buffer the same prior to the discharge, the feeding and for transportation devices may comprise a buffer for buffering a plurality of goods The heating device according to the invention may also comprise more than two heating lines on top of each other, whereby, if, for instance, three, four or five heating lines are arranged on top of each other, the feed and the transportation of the merchandise by means of the corresponding feeding and transportation devices likewise take place separately.

Moreover, it is possible in accordance with the invention that at least two heating lines are disposed next to each other with each of said heating lines having a corresponding number of heating lines in levels on top thereof.

As the heating and/or cooling of the merchandise along the heating lines may take place in a protective gas atmosphere, corresponding lock devices may be arranged between the heating line and the feeding and transportation devices. Such a lock device is to prevent protective gas from escaping into the environment so as to guarantee a closed protective atmosphere.

In order to be able to carry off the protective gas from the lock device, each of said lock devices may comprise a suction implement.

When treating especially printed boards as merchandise it is generally an advantage if the heating takes place in a certain time and/or at a certain temperature gradient, a processing at a certain temperature level for a predetermined time, and if a cooling and, if required, an intermediate heating takes place in an analogous fashion. This may advantageously be effected by being able to adjust a predetermined especially preprogrammed temperature profile along the heating line, which is then realized by the corresponding heating zones/devices and/or cooling zones/devices and the selection thereof.

In order to be able to directly feed externally fed merchandise in the horizontal transport level of the heating device according to the invention to at least one heating line without lifting or lowering the merchandise, at least one of said heating lines can be arranged in the horizontal transport level. Thus, the transportation of the merchandise away from said heating line is facilitated, as the merchandise can be transferred directly to the horizontal transport level by the transportation device, from which it is transported further, without having to additionally lift or lower the merchandise For the simplified connection to pretreatment or subsequent treatment devices for the merchandise, the feeding and/or transportation device may comprise a transporter provided in front or behind thereof in the direction of transport, via which the merchandise can be fed or removed to or from the heating device from outside. Said transporters transport the merchandise, for instance, to a subsequent treatment device provided behind the heating device in the direction of transport or, in an analogous fashion, from a pretreatment device in the direction towards the heating device.

The transporters and the other components of the heating device according to the invention may be arranged in a housing. In order to prevent protective gas from escaping from the transporters in said housing, said transporters may have lock devices especially with suction implements. Said lock device may be designed like the lock devices disposed between the heating line and the feeding and transportation device.

It is feasible to transport the merchandise along the corresponding heating line in a passive manner, i.e. the article of merchandise is pushed forward by the respectively following article of merchandise, for example, along slide rails or the like. In order to be able, however, to transport the articles of merchandise with a certain distance between each other and to change the transport speed, if required, an oven transporter may be disposed along each heating line. Such an oven transporter may be formed of driven rollers, driven belts, a driven merchandise carrier or the like.

In order to be able to directly and easily feed the merchandise from a transporter to the oven transporter by means of the feeding or transportation device, said feeding or transportation device may comprise a passthrough device connecting the transporter and the oven transporter in the horizontal transport level.

In order to be able to move the merchandise in such a passthrough device forward in the direction of the oven transporter, the passthrough device may comprise a slide or merchandise carrier movable in the direction of transport. Analogously such a slide or merchandise carrier may likewise be disposed in the transportation device.

Another possibility to move the merchandise in the passthrough device can be seen in that the same is provided with rotatable transport rollers. Said rollers may extend transversely to the direction of transport over the total width of the merchandise or may support the same along longitudinal edges.

In order to be able to easily use the slide or merchandise carrier in a circulating manner, they may be movable backwards opposite to the direction of the transport underneath the horizontal transport level in a transporter-associated initial position With a slide it can be considered advantageous in this connection if the same can be height-adjusted in a vertical direction. During its use it is thereby vertically adjusted towards the top so as to push an article of merchandise from the transporter into the passthrough device. In the following it can be moved downwardly in vertical direction so as to be movable on its way back underneath the horizontal transport level without interfering with additional slides or additional articles of merchandise. The slide may thereby have a lifting mechanism for essentially vertical height adjustment and a driving means essentially movable between the initial position and the discharge position of the slide associated with the heating line In order to be able to lift or respectively lower the merchandise to the different heating lines directly inside the feeding and/or transportation device; the feeding and/or transportation device may comprise a lifting device for the height-adjustment of the merchandise between heating lines arranged on top of each other, In the simplest case the lifting device may connect the horizontal transport level, especially in the passthrough device, and an upper transport level disposed vertically above the same with each other. The upper transport level may, for example, correspond with the level of the heating line located on top of the heating line arranged in the horizontal transport level.

If the distance of the horizontal and upper transport level is large enough, the lifting device may use the transport levels arranged between the horizontal and upper transport level as buffer.

In a simple embodiment the lifting device may comprise toothed chains circulating between the horizontal and the upper transport level, which have transport teeth gripping the merchandise from underneath at at least three positions and projecting essentially in the direction of the merchandise. By means of said three positions the merchandise is to be maintained in a horizontal plane and by a synchronous movement of the circulating toothed chains it is to be moved between the different transport levels.

For the safe transport and the safe support of merchandise, two toothed chains may thereby each be arranged opposite each other at rear side faces in the transport direction or at front side faces in the transport direction of the essentially board-shaped merchandise. A total of four transport teeth thereby grip the merchandise from underneath.

In order to be able to achieve a feed to a heating line in the passthrough device, to move merchandise in a vertical direction in the buffer and to feed the merchandise to the at least one additional heating line in the upper transport level, the movement of the lifting device may be clocked. In a first cycle an article of merchandise is, for example, transferred from the passthrough device to the heating line disposed in the horizontal transport level. In the next cycle another article of merchandise is fed to the passthrough device and is arranged in a transport level of the buffer subsequently. During the following cycles another article of merchandise is respectively fed to the passthrough device and is likewise lifted vertically, until, for instance, the buffer is filled and an article of merchandise is likewise arranged in the upper transport level. When the buffer is filled an article of merchandise can each be fed to the respective heating line in the upper and in the horizontal transport level at the same time. Next an article of merchandise is fed from the buffer to the upper transport level and another article of merchandise is fed from the passthrough device again to the buffer, and an article of merchandise is subsequently arranged in the passthrough device. Next the two heating lines may be charged again.

The transport of merchandise by means of the transportation device having a corresponding buffer takes place in an analogous manner.

In order to be able to transfer merchandise to the corresponding heating line in the upper transport level, said heating line may also comprise at least one slide or merchandise carrier for the transfer of the merchandise to the heating line. The slide or merchandise carrier, respectively, may be designed like the corresponding devices of the horizontal transport level and especially the respective transporter, i.e. they may comprise a lifting mechanism and a corresponding driving means. Likewise driven transport rollers may be disposed in the upper transport level.

In the simplest case the lifting devices of the feeding and transportation devices may be designed identically. One lifting device thereby only serves to lift the merchandise and the other serves to lower the merchandise.

In another embodiment of the lifting device the same may comprise an arrangement of lifting or retaining forks disposed next to each other and being vertically and/or perpendicularly adjustable to the direction of transport, each of which comprises a number of transport teeth projecting in the direction of the merchandise. Especially the lifting forks thereby move vertically and perpendicularly to the direction of transport. When the lifting forks move vertically, merchandise correspondingly placed thereon is lifted, whereby associated retaining forks are moved outwardly relative to the direction of transport. Upon moving the retaining forks to the merchandise they grip the same from underneath with the corresponding transport teeth and the lifting forks may be moved away in an outward direction. Said lifting forks are then vertically offset in a downward direction by one transport level, where they grip again a corresponding article of merchandise from underneath. The preceding process is then repeated so that, clocked by the interaction of lifting and retaining forks, the article of merchandise is lifted or respectively lowered with correspondingly reversed movements.

The interaction of lifting and retaining forks may also correspondingly take place such that two retaining forks are associated with a lifting fork, whereby the lifting fork is then located between said two retaining forks. In other words, two lifting forks or retaining forks may each be associated with a retaining fork or a lifting fork, at the ends of which they are disposed in the direction of transport.

In order to be able to transport merchandise away from the area of the lifting or retaining forks in the horizontal and upper transport level, driven transport rollers may be disposed on the lifting and/or retaining forks at least in the area of the horizontal and upper transport level.

A simple embodiment for transporting the merchandise is achieved, for example, in that the transporter and/or the oven transporter comprise two transport belts circulating parallel to the direction of transport and spaced apart from each other, on which lie lateral edges of the merchandise.

In order to be able to extend the heating device according to the invention in an easy manner or to adapt it to changed conditions, the heating lines and/or feeding and/or transportation devices and or transporters may be designed as modules.

In the following advantageous embodiments will be explained in more detail by means of the figures shown in the attached drawing, wherein.

Figure 1:
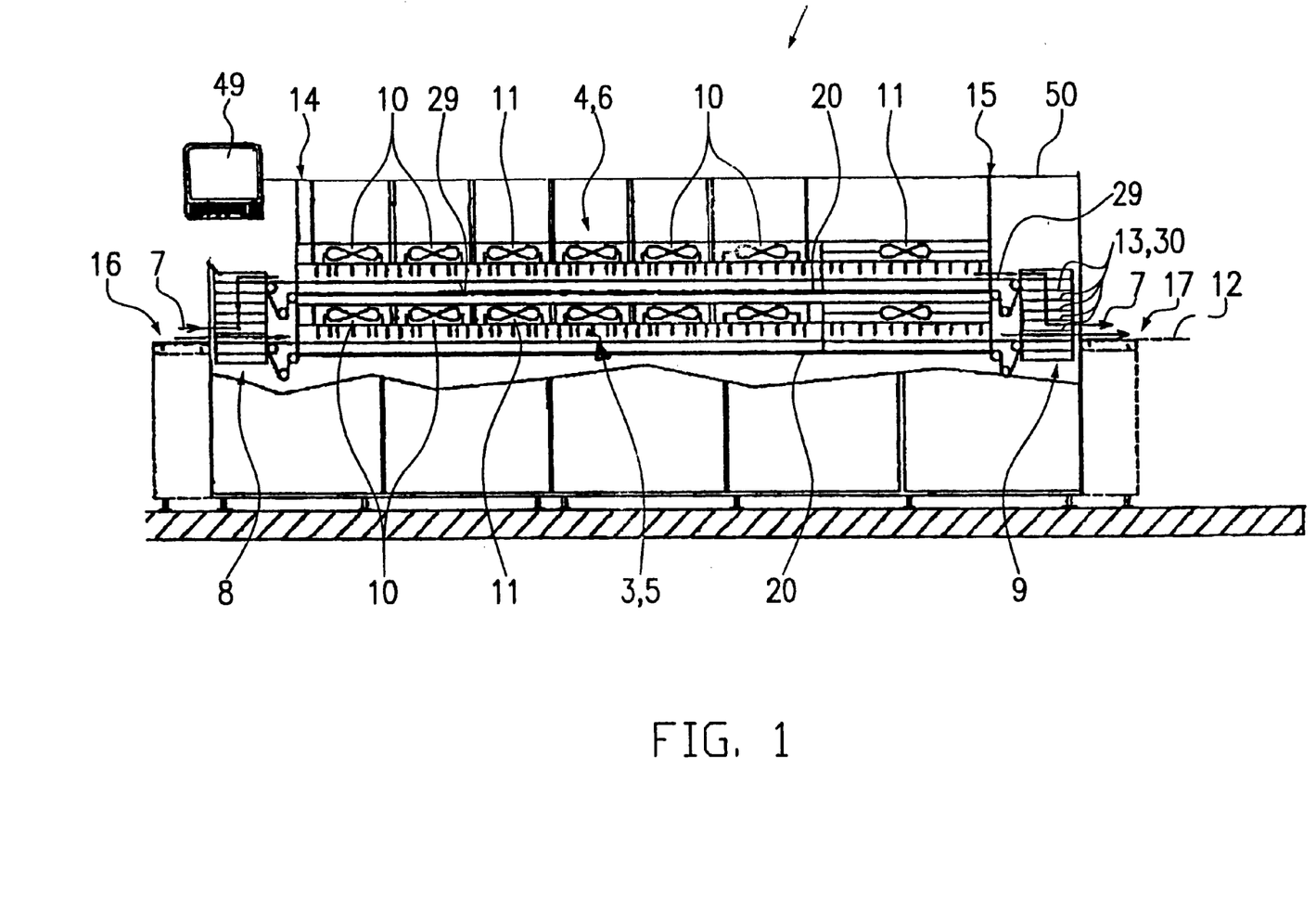
FIG. 1 shows a partially sectional lateral view of a heating device according to the invention in the direction of transport.

In FIG. 1 the whole heating device 1 is illustrated in a lateral view and partially sectional. The heating device 1 comprises a number of heating zones 10 or cooling zones 11 arranged along heating lines 3, 4, 5, 6. The heating zones may have corresponding heating devices and the cooling zones may have corresponding active cooling devices. The heating lines 3 and 5 are arranged in a horizontal transport level 12 next to each other and parallel to each other. From said heating lines the heating line 3 is directly visible while the heating line 5 in the plane of the figure is positioned behind heating line 3. On top of the heating lines 3, 5 the additional heating lines 4, 6 are disposed in an upper transport level 29, whereby heating line 4 lies vertically on top of heating line 3 and heating line 6 lies vertically on top of heating line 5.

The different heating zones may be used, for instance, for re-melting solder paste (reflow soldering), for hardening adhesives, for fixing components on printed boards, for drying lacquer on the printed board or the like. Another application relates to the so-called vapor phase soldering or condensation soldering (VP (vapor phase) soldering), whereby a corresponding lowering means may be provided in at least one of the heating lines 3 to 6, by means of which printed boards are lowered into a vapor blanket above a boiling working liquid, where the corresponding solder is transferred to the printed board by the vapor phase. In the following the printed board is lifted again from the vapor blanket and is moved further along, for example, the horizontal transport level 12 For the VP soldering corresponding lock devices for insulating the vapor zone may likewise be disposed along a heating line.

Additional lock systems may be disposed between the different heating zones and/or cooling zones according to need. At least at the ends of the corresponding heating lines lock devices 14, 15 are disposed, by which a corresponding protective gas inside the heating device 1 is prevented from escaping into the environment.

A feeding device 8 or respectively a transportation device 9 is provided in front of or behind heating lines 4 to 6. A separate feed of the heating lines 3, 4 or respectively 5, 6, which are arranged on top of each other, is effected by the feeding device 8. A separate recirculation of printed boards treated along the heating lines back to the horizontal transport level 12 is effected by the transportation device 9.

Between the horizontal and upper transport level 12, 29 different additional transport levels 30 are disposed in the area of the feeding device 8 and the transportation device 9, which have the function of a buffer 13. A vertical lifting or lowering of the corresponding article of merchandise, e.g. printed boards, in the feeding device 8 and the transportation device 9 takes place in the area of the transport level 30 of the buffer 13. The transfer to the heating lines or respectively the transfer of the merchandise from the heating lines each take place in the horizontal and the upper transport level 12, 29.

A transporter 16 is provided in front of the feeding device 8 in the direction of transport 7 of the merchandise, which likewise forms part of the heating device 1. An additional transporter 17 is analogously provided behind the transportation device 9 in the direction of transport 7. Transporters 16, 17 serve the feeding of merchandise to the heating device 1 or, respectively, the corresponding transportation of the merchandise to other devices or the like.

Figure 3:
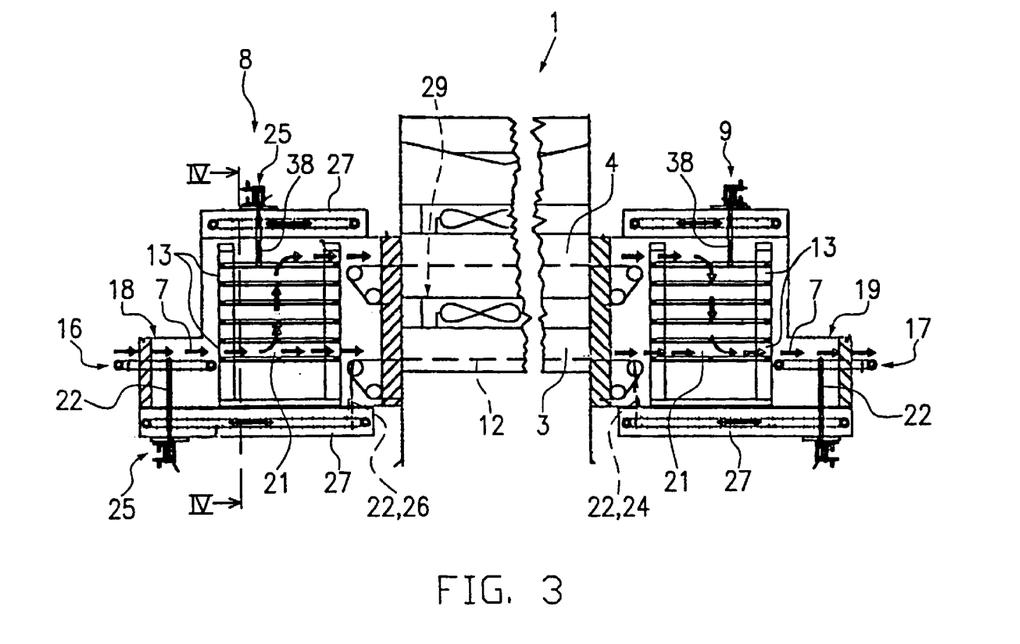
FIG. 3 shows a partially illustrated sectional view of the heating device according to FIG. 1 comprising a slide.

Heating lines 3 to 6 and at least also the feeding device 8 as well as the transportation device 9 are disposed in a housing 50 of the device, which may contain transporters 16, 17, see, for example, FIG. 3.

A predetermined temperature profile for treating the merchandise, which may, for instance, be preprogrammed by a computer 49, can be adjusted. Due to the arrangement of the different heating lines 3, 4 and 5, 6 on top of each other and next to each other and due to the corresponding buffer in the feeding device 8 and the transportation device 9 a large throughput can be obtained by the heating device 1 according to the invention, so that, for example, merchandise in the form of printed boards can be processed by the heating device 1 to a large extent and relatively fast.

Figure 2:
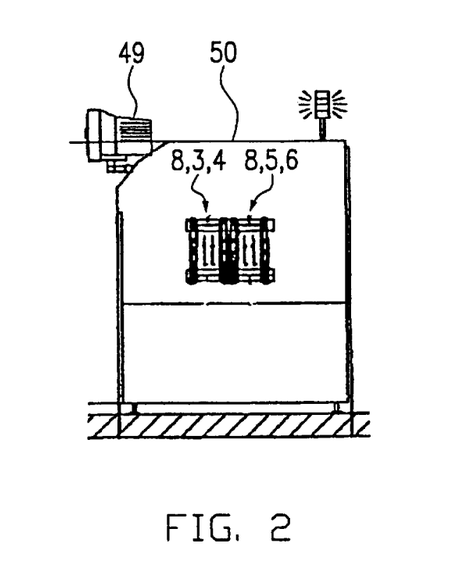
FIG. 2 shows a front view of the heating device according to FIG. 1.

It is self-evident that one or, if necessary, several printed boards can be disposed and treated successively along a heating line in each of the different heating zones and cooling zones FIG. 2 illustrates a front view of the heating device 1 from FIG. 1. It can especially be seen that likewise two feeding devices 8 are disposed next to each other so as to correspondingly supply the heating lines 3, 4 and 5, 6 arranged in pairs on top of each other with printed boards.

FIG. 3 shows the heating device 1 for an embodiment of the feeding device 8 and the transportation device 9 in detail.

In said figure, just like in the additional figures, identical parts are designated by identical reference numbers, whereby some parts are described only in connection with a figure, if required.

Figure 5:
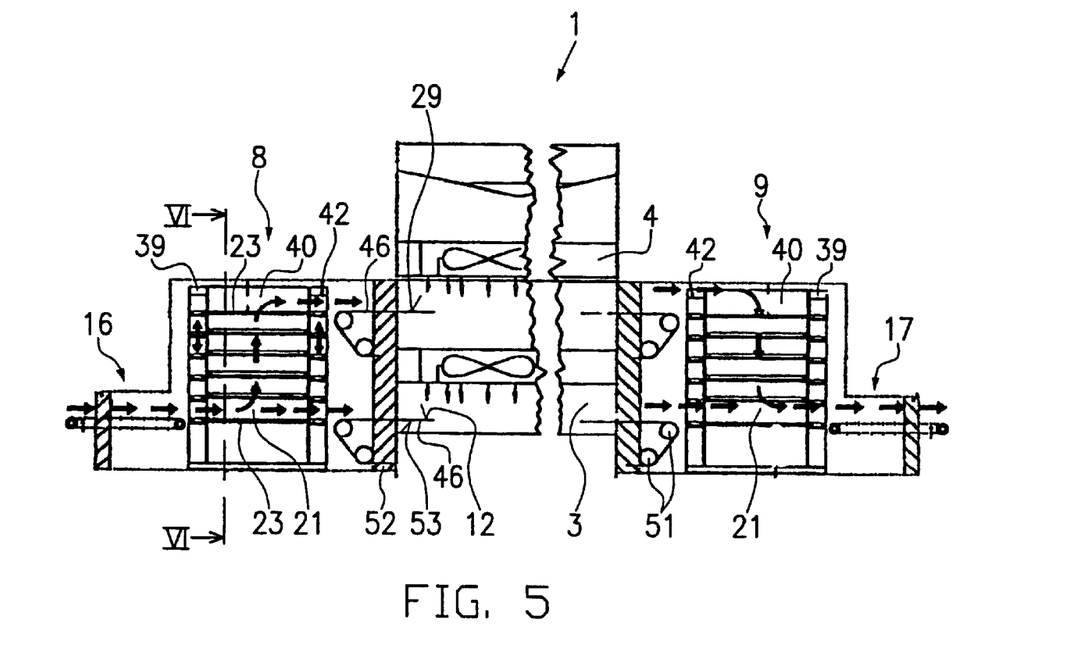
FIG. 5 shows a partially illustrated lateral view of the heating device according to FIG. 1 comprising transport rollers.

In FIG. 3, just like in FIG. 5, the feeding device 8 and the transportation device 9 have identical constructions, whereby a lifting of the printed boards and the feed to the different heating lines in the feeding device 8 and a lowering and removal of the printed boards from the different heating lines in the transportation device 9 takes place correspondingly.

In FIGS. 3 and 5 the transporters 16, 17 are at least partially disposed inside the housing 50 of the device, see also FIG. 1 Additional lock devices 18, 19 are associated with the transporters 16, 17 so as to prevent protective gas possibly carried along from escaping from the heating device 1.

The transporters 16, 17 are formed by two circulating transportation belts separated from each other perpendicularly to the direction of transport 7, which support the merchandise along the lateral edges. A slide 22 can engage between the two transport belts. Said slide 22 moves the merchandise through a passthrough device 21 in the direction of the heating line 3. The passthrough device 21 is the lowermost transport level of the feeding device 8, which corresponds to the horizontal transport level 12. For adjusting the slide 22 in the direction of transport 7, the same is movably connected with a driving means 27 in form of a circulating driving chain or the like. In FIG. 3 the slide 22 is disposed approximately in its initial position 24, in which it engages behind an article of merchandise on the transporter 16 so as to be capable of displacing the article of merchandise along the horizontal transport level 12 in the direction of transport 7 until the discharge position 26 is reached. In order to be able to move the slide 22 from its discharge position 26 back to its initial position 24 without obstructing, for example, a printed board transported into the passthrough device 21, the slide 22 is connected to a lifting mechanism 25, which is able to lift or respectively lower the slide in a vertical direction.

A corresponding slide 38 is provided with an analogous driving means 27 and a lifting mechanism 25 for the upper transport level 29 in the feeding device 8, where the slide serves to transfer the merchandise to the upper heating line 4.

The transportation device 9 is, as was already explained above, constructed analogously, whereby the corresponding slides 38, 22 in reverse direction serve to transfer the merchandise into the transportation device 9 or, respectively, to transfer it to the transporter 17.

In the embodiment according to FIG. 3 four transport levels 30 are arranged as buffer 13 between horizontal and upper transport level 12, 29. By the clocked operation of the feeding device 8 and the transportation device 9, respectively, merchandise is lifted through the different transport levels 30 from the horizontal transport level 12 to the upper transport level 29, or is lowered in the transportation device 9 in reverse direction.

For transporting the merchandise along the different heating lines 3, 4 corresponding transport belts 46, 47 are provided which equally circulate in pairs next to each other for supporting the board-shaped merchandise along lateral edges in the direction of transport, see also FIG. 5.

Figure 4:
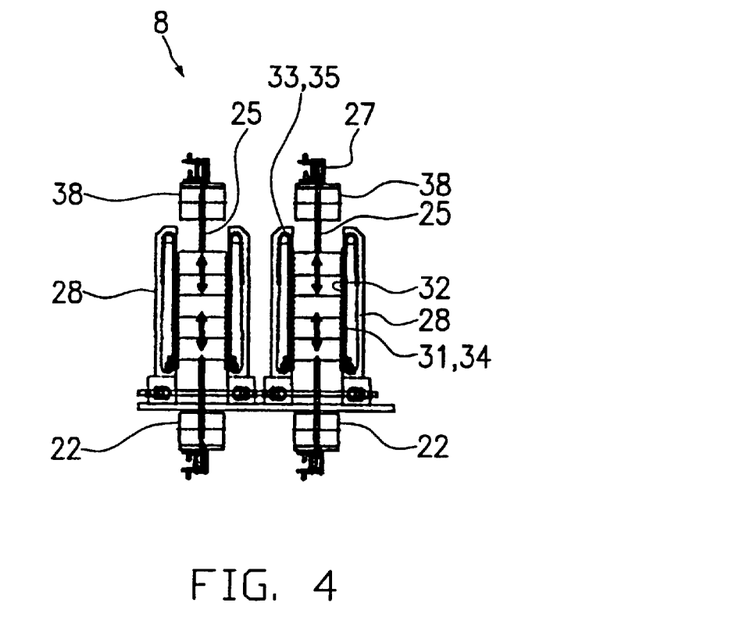
FIG. 4 shows a section along line IV—IV from FIG. 3.

A section through the feeding device 8 along line IV—IV from FIG. 3 is illustrated in FIG. 4.

Two lifting devices 28 are arranged next to each other, through which the feeding device 8 can feed two heating lines arranged in pairs next to each other with corresponding merchandise. The lifting device 28 is formed by a toothed chain or toothed belt 31, 33, 34, 35 circulating in a vertical direction, from which corresponding transport teeth 32 project in the direction of the merchandise. The toothed chains 31, 33, 34, 35 are each arranged by pairs at front and rear ends of the merchandise in the direction of transport 7 inside the feeding device 8, also see FIG. 3. The corresponding transport teeth 32 grip rear and front side faces 36, 37 of the merchandise from underneath at both sides, also see FIG. 7. By movement of the toothed chains merchandise in the form of printed boards is correspondingly lifted in the feeding device 8 and lowered in the transportation device 9. The different toothed chains are driven synchronously so as to align each of the printed boards in the corresponding transport level or the horizontal or upper transport level.

The different slides 22, 38 shown in FIG. 4 are illustrated in their position retracted along the associated lifting mechanisms 25 of feeding device 8, in which they do not engage between printed boards successively disposed in the direction of transport for displacing them, In FIG. 5 the heating device 1 is illustrated in a second embodiment for the feeding device 8 and the transportation device 9. Otherwise the construction corresponds to heating device 1 according to FIG. 3 with corresponding heating lines and transporters 16, 17.

Figure 7:
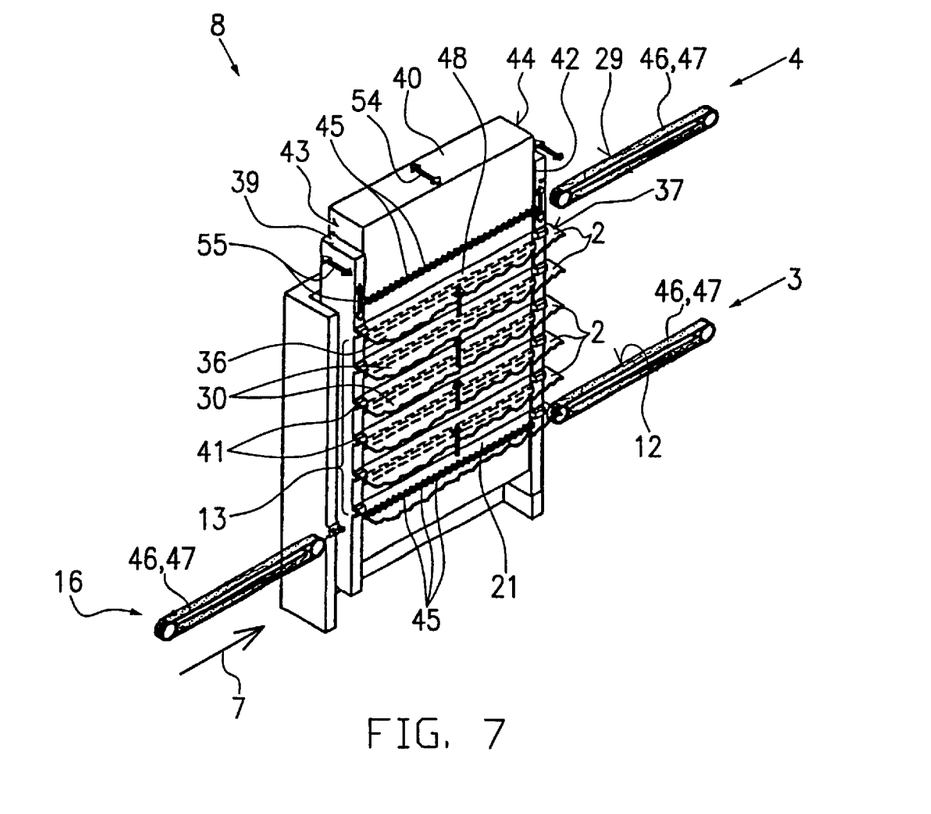
FIG. 7 shows a perspective illustration of a section along line VII—VII from FIG. 6.

The feeding device 8 and the again identically constructed transportation device 9 as illustrated in FIG. 5 are provided with a retaining fork 40 and lifting forks 39, 42 disposed at the end 43, 44 thereof, see FIG. 7. Said lifting forks are disposed by pairs at both sides to the corresponding printed board transversely to the direction of transport.

The lifting forks 39, 42 can be adjusted in vertical direction as well as in a perpendicular direction thereto, see the directions of adjustment 55 in FIG. 7. The retaining fork 40 can be adjusted perpendicularly to the direction of transport 7 in direction of adjustment 54, see again figure 7. In the area of the horizontal and upper transport level 12, 29 transport rollers 45 are disposed on the retaining fork 40 which are driven in the direction of transport for conveying the printed boards 2. In the transport levels 30 of the buffer 13 arranged between the horizontal and the upper transport level corresponding transport teeth 41 or transport rails 41 are disposed, whereby the transport teeth or transport rails each can extend over the total length of the lifting forks 39, 42 or respectively retaining fork 40 in the direction of transport 7.

The transport belts 46 and 47 of the different heating lines are moved by driving or deflection rollers 51, whereby each transport belt is formed by a carrying run 53 moved in the direction of transport 7 and a lower run 52 moved in opposite direction.

Figure 6:
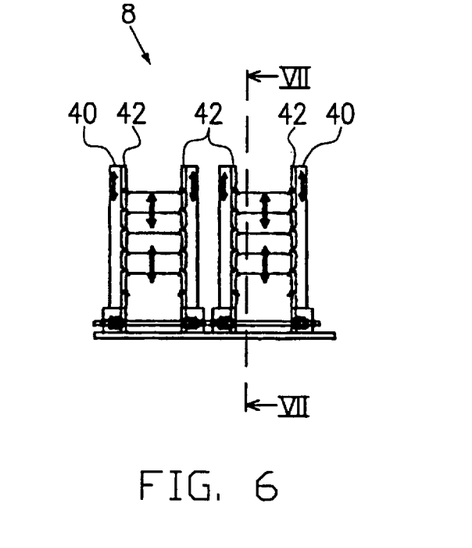
FIG. 6 shows a section along line VI—VI from FIG. 5.

FIG. 6 shows a section along line VI—VI from FIG. 5. The retaining fork 40 with lifting forks 39, 42 are disposed opposite each other by pairs so as to be able to correspondingly supply heating lines 3, 4 and 5, 6 disposed by pairs next to each other and on top of each other with corresponding printed boards, see, for instance, FIG. 1. It be pointed out once more that the transportation device 9 is constructed analogously, and reference is in this respect made to the description of the feeding device 8.

A section along line VII—VII from FIG. 6 in a perspective view is shown in FIG. 7.

Corresponding printed boards 2 are illustrated in the transport levels 30 of the buffer 13 and the horizontal transport level 12. In the working cycle of the feeding device 8 according to FIG. 7 the retaining fork 40 is outwardly displaced in a direction perpendicular to the direction of transport 7, so that the printed boards 2 lie on corresponding transport teeth 41 of the lifting forks 39, 42 on both sides at their rear and front side faces 36, 37. In a subsequent working cycle the lifting forks 39, 42 are displaced upwardly in vertical direction until all printed boards 2 are lifted upwardly by one transport level. In the following the retaining fork 40 is moved towards the printed boards until the printed board 2 illustrated as the uppermost one in FIG. 7 lies on the transport rollers 45 in the upper transport level 29. In order to place another printed board in the horizontal transport level 12 and in order to be able to lift it afterwards, lifting forks 39, 42 are vertically displaced in a downward direction and are approached with their transport teeth 41, to the printed boards 41 once their lowered position is reached. Thereafter, another printed board can be pushed into the passthrough device 21 in the horizontal transport level 12 by means of the transport belts 46, 47 of the transporter 16, whereupon it can be transported further by the transport rollers 45 of the retaining fork 40 to the heating line 3 following in the direction of transport 7. At the same time the printed board in the upper transport level 29 can likewise be transferred to the heating line 4.

By corresponding additional working cycles of lifting forks 39, 42 and retaining fork 40 additional printed boards of the upper transport level 29 or, respectively, via transport levels 12, 29, can be transferred to the respective heating lines 3, 4.

The function of the transportation device 9 takes place analogously, whereby the retaining fork 40 and the lifting forks 39, 42 are used for the removal and for lowering the printed boards

What is claimed is:

1. Heating device for heating merchandise comprising:
    a feeding device provided in front of at least one heating line in the transport direction of the merchandise and a transportation device for discharging provided behind the heating line in the transport direction, wherein a plurality of temperature processing devices are associated with the heating line, wherein at least two heating lines are disposed on top of each other to which the merchandise can be separately fed by the feeding device from a horizontal transport level, and wherein the merchandise can be separately discharged by the transportation device from the heating lines back into a horizontal transport level and further wherein at least one of the feeding device and the transportation device comprises a buffer for buffering a plurality of articles of merchandise, and wherein at least one of the feeding device and the transport device comprise a lifting fork and a retaining fork which are associated with each other and are disposed at the ends of the at least one of the feeding device and the transport device with respect to the direction of transport.

2. Heating device according to claim 1, wherein at least two heating lines are arranged next to each other.

3. Heating device according to claim 1, wherein a lock device is disposed between the heating line and feeding device.

4. Heating device according to claim 3, wherein the lock device comprises a suction element.

5. Heating device according to claim 1, comprising a controller adapted for imposing a predetermined, especially preprogrammable temperature profile along the heating line.

6. Heating device according to claim 1, wherein at least one heating line is disposed in the horizontal transport level.

7. Heating device according to claim 1, wherein at least one of the feeding device and the transportation device comprises a transporter provided in front of or behind the at least one of the feeding device and the transportation device in the direction of transport by which the merchandise can be externally fed to or removed from the heating device.

8. Heating device according to claim 7, wherein a lock device comprising a suction element is associated with the transporter.

9. Heating device according to claim 8, wherein an oven transporter is disposed along the heating line.

10. Heating device according to claim 9, wherein at least one of the feeding device and the transportation device comprises a passthrough device connecting the transporter and the oven transporter in the horizontal transport level.

11. Heating device according to claim 10, wherein the passthrough device comprises a movable slide or a movable merchandise carrier.

12. Heating device according to claim 10, wherein the passthrough device comprises rotatable transport rollers.

13. Heating device according to claim 11, wherein the movable slide or movable merchandise carrier is mounted opposite to the direction of transport underneath the horizontal transport level in a transporter-associated initial position with the ability to be moved backwards.

14. Heating device according to claim 12, wherein the passthrough device comprises a movable slide, and the movable slide comprises a lifting mechanism essentially for the vertical height adjustment and a driving means movable between the initial position and a discharge position associated with one of the heating lines.

15. Heating device according to claim 1, wherein at least one of the feeding devices and the transportation devices comprises a lifting device between the heating lines for adjusting the height of the merchandise.

16. Heating device according to claim 15, wherein the lifting device connects the horizontal transport level and an upper transport level arranged vertically on top of said transport level with each other.

17. Heating device according to claim 16, wherein the lifting device comprises transport levels arranged between the horizontal and upper transport level as a buffer.

18. Heating device according to claim 16, wherein the lifting device comprises toothed chains circulating between the horizontal and upper transport level with transport teeth essentially projecting in the direction of the merchandise and gripping the merchandise from underneath at at least three positions.

19. Heating device according to claim 18, wherein two toothed chains are arranged opposite each other at rear and at front side faces of the essentially board-shaped merchandise in the direction of transport.

20. Heating device according to claim 15, wherein the movement of the lifting device is clocked.

21. Heating device according to claim 1, wherein at least one slide for transferring the merchandise to the heating line is associated with the upper transport level.

22. Heating device according to claim 15, wherein lifting devices of the feeding device and the transportation device are constructed identically.

23. Heating device according to claim 15, wherein the lifting device comprises lifting and retaining forks disposed next to each other and adjustable at least in one direction of vertical and perpendicular to the direction of transport, each lifting device comprising a number of transport teeth projecting in the direction of the merchandise.

24. Heating device according to claim 1, wherein drivable transport rollers are disposed on at least one of the retaining fork and the lifting fork at least in a region of the horizontal or upper transport level.

25. Heating device according to claim 9, wherein at least one of the transporter and the oven transporter comprise two transport belts circulating parallel to the direction of transport and spaced apart from each other and adapted to support lateral edges of the merchandise.

26. Heating device according to claim 1, wherein at least one of the heating lines, the feeding device, and the transportation device are designed as modules.

27. Heating device according to claim 1, wherein the temperature processing devices include heating devices and cooling devices.

28. Heating device according to claim 1, wherein the merchandise comprises a printed circuit board.

29. Heating device according to claim 1, wherein a lock device is disposed between the heating line and the transportation device.

30. Heating device for heating merchandise comprising:
a feeding device provided in front of at least one heating line in the transport direction of the merchandise and a transportation device for discharging provided behind the heating line in the transport direction, wherein a plurality of temperature processing devices are associated with the heating line, wherein at least two heating lines are disposed on top of each other to which the merchandise can be separately fed by the feeding device from a horizontal transport level and wherein the merchandise can be separately discharged by the transportation device from the heating lines back into a horizontal transport level and further wherein at least one of the feeding devices and the transportation device comprises a buffer for buffering a plurality of articles of merchandise and a transporter provided in front of or behind at least one of the feeding devices and the transportation device in the direction of transport by which the merchandise can be externally fed to or removed from the heating device, wherein a lock device comprising a suction element is associated with the transporter, wherein an oven transporter is disposed along the heating line and at least one of the feeding devices and the transportation device comprises a passthrough device connecting the transporter and the oven transporter in the horizontal transport level, which passthrough device comprises a movable slide or a movable merchandise carrier.

31. Heating device according to claim 30, wherein the movable slide or movable merchandise carrier is mounted opposite to the direction of transport underneath the horizontal transport level in a transporter-associated initial position with the ability to be moved backwards.

32. Heating device for heating merchandise comprising:
a feeding device provided in front of at least one heating line in the transport direction of the merchandise and the transportation device for discharging provided behind the heating line in the transport direction, wherein a plurality of temperature processing devices are associated with the heating line, wherein at least two heating lines are disposed on top of each other to which the merchandise can be separately fed by the feeding device from a horizontal transport level, and wherein the merchandise can be separately discharged by the transportation device from the heating lines back into a horizontal transport level and further wherein at least one of the feeding devices and the transportation device comprises a buffer for buffering a plurality of articles of merchandise, and a lifting device between the heating lines for adjusting the height of the merchandise, which lifting device connects the horizontal transport level and an upper transport level arranged vertically on top of the transport level with each other and which lifting device comprises toothed chains circulating between the horizontal and upper transport level with transport teeth essentially projecting in the direction of the merchandise and gripping the merchandise from underneath at at least three positions.

33. Heating device according to claim 32, wherein two toothed chains are arranged opposite each other at rear and at front side faces of the essentially board-shaped merchandise in the direction of transport.

34. Heating device for heating merchandise comprising:
a feeding device provided in front of at least one heating line in the transport direction of the merchandise and the transportation device for discharging provided behind the heating line in the transport direction, wherein a plurality of temperature processing devices are associated with the heating line, wherein at least two heating lines are disposed on top of each other to which the merchandise can be separately fed by the feeding device from a horizontal transport level, and wherein the merchandise can be separately discharged by the transportation device from the heating lines back into a horizontal transport level and further wherein at least one of the feeding devices and the transportation device comprises a buffer for buffering a plurality of articles of merchandise, wherein at least one slide for transferring the merchandise to the heating line is associated with the upper transport level.

35. Heating device for heating merchandise comprising:
a feeding device provided in front of at least one heating line in the transport direction of the merchandise and the transportation device for discharging provided behind the heating line in the transport direction, wherein a plurality of temperature processing devices are associated with the heating line, wherein at least two heating lines are disposed on top of each other to which the merchandise can be separately fed by the feeding device from a horizontal transport level, and wherein the merchandise can be separately discharged by the transportation device from the heating lines back into a horizontal transport level and further wherein at least one of the feeding devices and the transportation device comprises a buffer for buffering a plurality of articles of merchandise, and a lifting device between the heating lines for adjusting the height of the merchandise which lifting device further comprises lifting and retaining forks disposed next to each other and adjustable in at least one direction of vertical and perpendicular to the direction of transport, each lifting device comprising a number of transport teeth projecting in the direction of the merchandise.

\* \* \* \* \*